United States Patent [19]

Taubert

[11] Patent Number: 4,824,418
[45] Date of Patent: Apr. 25, 1989

[54] ARTICULATED JOINT BETWEEN TWO SHAFTS

[76] Inventor: Hubert Taubert, Wingertsbergstrasse 3, 5450 Neuwied 23, Fed. Rep. of Germany

[21] Appl. No.: 45,847
[22] PCT Filed: Aug. 21, 1986
[86] PCT No.: PCT/DE86/00337
 § 371 Date: Apr. 23, 1987
 § 102(e) Date: Apr. 23, 1987
[87] PCT Pub. No.: WO87/01165
 PCT Pub. Date: Feb. 26, 1987

[30] Foreign Application Priority Data
Aug. 24, 1985 [DE] Fed. Rep. of Germany ... 8524285[U]

[51] Int. Cl.[4] ............................................. F16D 3/18
[52] U.S. Cl. ............................................. 464/159
[58] Field of Search ............... 464/106, 156, 158, 159

[56] References Cited
U.S. PATENT DOCUMENTS

| | | | |
|---|---|---|---|
| 1,274,254 | 7/1918 | Fleek | 464/158 |
| 2,951,396 | 9/1960 | Kooistra | 464/159 X |
| 2,984,995 | 5/1961 | Kalen | 464/159 |
| 3,427,825 | 2/1969 | John et al. | 464/159 |
| 3,635,048 | 1/1972 | Monti | 464/159 X |
| 3,940,946 | 3/1976 | Andersen | 464/156 X |

FOREIGN PATENT DOCUMENTS

| | | | |
|---|---|---|---|
| 20665 | 1/1883 | Fed. Rep. of Germany | 464/158 |
| 1728574 | 8/1977 | Fed. Rep. of Germany | |
| 1410767 | 8/1965 | France | |
| 940354 | 10/1963 | United Kingdom | 464/158 |

Primary Examiner—Daniel P. Stodola
Attorney, Agent, or Firm—Stanger, Michaelson, Reynolds, Spivak & Tobia

[57] ABSTRACT

Articulated joint comprising a cylindrical hollow drive element (2) and a spherical drive element (5) at the end of in each case one shaft (1,2), in which the hollow drive element (2) is roughly shaped like a hollow cylinder with a wavy inner profiling and the spherical drive element (5) has a spherical shape with a wavy profiling complimentary thereto, in such a way that even on pivoting the shafts with respect to one another there is a positive connection and reliable force transfer during rotation (FIG. 1).

26 Claims, 3 Drawing Sheets

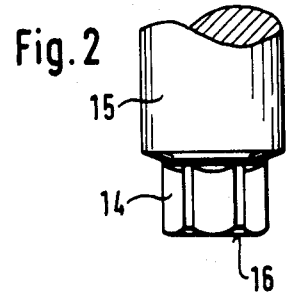
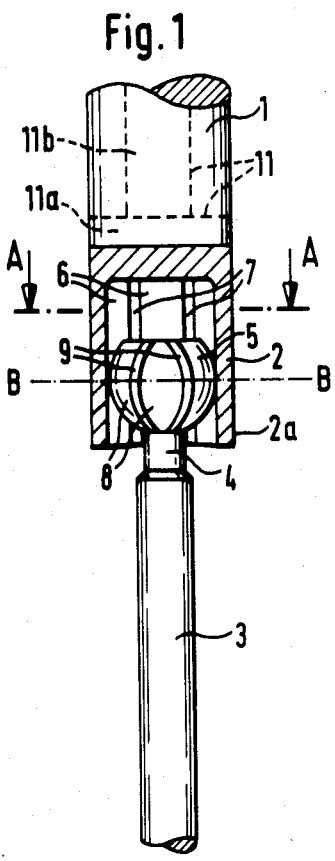
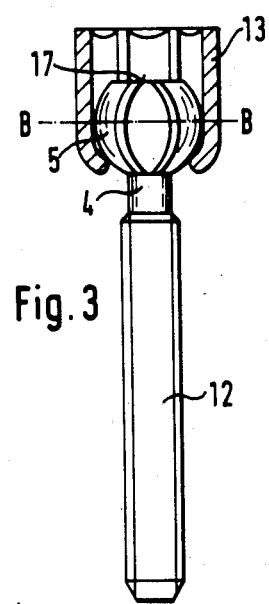
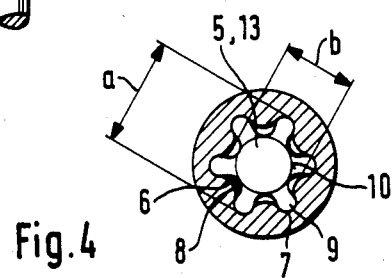

ARTICULATED JOINT BETWEEN TWO SHAFTS

FIELD OF APPLICATION

This invention relates to articulated joints, particularly of the type for coupling shafts that pivot with respect to each another.

PRIOR ART

In known articulated or hinged joints, a first drive element at the end of a first rotary shaft pivotably engages a second drive element at the end of a second rotary shaft in a manner that allows the shafts to pivot with repsect to each other through a given angle. Such articulated joints are known as cardan or universal joints.

In the past, such joints were excessively complex, required large amounts of space, could not easily be encapsulated, or could not readily accommodate both high and low drive powers.

OBJECTS AND SUMMARY OF THE INVENTION

An object of the invention is to improve joints of this type.

Another object of this invention is to eliminate the aforementioned disadvantages.

According to the invention an articulated joint of the aforementioned type is constructed in such a way that it is formed from simple elements, has a limited space requirement, can be easily encapsulated and can be readily used for large and small drive powers.

According to the invention this problem is solved in that the first drive element is roughly shaped like a hollow cylinder having on the inner surface axis-parallel, uniformly circumferentially distributed, alternately convex and concave depressions and elevations which pass into one another and that the second drive element is roughly spherical and on its surface has alternating depressions and elevations, which in the longitudinal direction run approximately in accordance with a plane containing the axis of the second shaft and which in the circumferential direction and in particular in the equatorial plane of the spherical second drive element have a configuration roughly complimentary to the inner surface of the first drive element.

In the case of such an articulated joint, the two shafts can be pivoted from a position in which the axes are aligned by a given amount in a random direction.

In the construction according to the invention, the first drive element is provided on its inside and the second, spherical drive element on its outside with in each case one wavy line profile which, considered in the axle direction, comprises groove-like depressions and web-like elevations. Much in the same way as the teeth and gaps of a toothed drive, these grooves and webs engage with one another in certain regions of the spherical surface, so that the desired drive takes place. It is of no significance which drive element is rotated by the driving shaft and which drive element drives the outgoing shaft.

Such a force transfer, in which both drive elements are cylindrical, is known in connection with screw tools from German Pat. No. 17 28 574 and is commercially available under the trademark TORX. The cylindrical construction of both drive elements ensures that sloping or inclining of the tool is not possible, the axis of the screw and the associated tool (wrench) being aligned with one another.

According to the invention an articulated joint is obtained in which the axes of the two shafts can be pivoted with respect to one another by a certain amount. On pivoting or tilting the axes of the two shafts intersect roughly in the centre of the spherically constructed part of the second drive element. If this spherical part is compared with the globe, the drive element axis coinciding with the earth's axis, the groove-like depressions or web-like elevations run roughly in accordance with degrees of longitude on the globe, whilst the inner face of the first drive element engages roughly corresponding to a circumferential line of the globe, which intersects the equator.

Preferably, the drive elements have in each case six depressions between six elevations.

According to a construction of the invention the transitions between the depressions and elevations are gradual, so that everything is rounded and sharp edges are avoided. Preferably the median plane (plane of symmetry) of each depression or elevation contains the rotation axis of the particular drive element. This means that the shafts can easily be pivoted with respect to one another and the transferred force has virtually no action on the pivoting.

According to a preferred embodiment on the spherical, second drive element the depressions are at least in part narrower than the elevations of the first drive element or the elevations are at least in part narrower than the depressions of the first drive element. As a result the necessary clearance exists, so that jamming is avoided during pivoting or tilting. Due to the depressions and elevations becoming narrower, as from the equatorial zone of the spherical drive element and towards the two poles, the shafts are pivotably engageable with one another.

The three-dimensional pivot angle of the spherical articulated joint in the case of the spherical drive element on the one hand results from the narrowing flank, included or bevel angles of the maxima of the convex elevation or the minima of the concave depression and the turning or reversal points thereof from the equatorial plane to the pole or polar caps and on the other hand in the case of the hollow drive element through the constant flank, included or bevel angles obtained from the maxima of the convex elevation and the minima of the concave depression and their turning or reversing points. The geometry of the hollow drive element is congruent with the spherical geometry in its equatorial plane.

The perimeter in the maximum of the convex elevation and the inner circle in the minimum of the concave depression are defined by A and B in TORX drive elements. The convex radius is designated $F_{Rad}$ and the concave radius $E_{Rad}$. In the case of TORX $F_{Rad} < E_{Rad}$. The centres of these radii are located on different circles. The convex and concave radii passing into one another form reversing points forming angles to the maximum of the convex elevation and the minimum of the concave depression and which are referred to as convex and concave flank angles. Passing from the equatorial plane of the spherical drive element to the two poles the elevations and depressions become narrower or the convex and concave flank angles become smaller. In the transition to the poles, the convex and concave flank angles no longer form a common tangent and instead constitute two crossing tangent jump functions. The angles of the maximum and minimum to the reversing points pass into a vertical line in the poles.

For manufacturing reasons the spherical drive element is not extended to the north pole or south pole. There are no north and south spherical portions, so that there is a spherical layer as the drive.

The three-dimensional swivel angle is obtained on the one hand from the difference of the dihedral angles $\gamma1+\gamma2$ (in radian measure) of the spherical wedges of pole N to reversal points A and B of the convex and concave radii or from the tapering flank angles of the convex and concave flanks from the equator to the poles of the spherical drive and on the other hand from the constant flank angles of the hollow drive element and the clearance resulting from the geometrys of the two drive elements.

The convex and concave radii of the hollow drive element are complimentary to the geometry in the equatorial plane of the spherical drive element.

In order to increase this clearance, or if the driving and driven shaft is connected to a frame or casing, which largely surrounds the sphere and must naturally give a pivot angle, the centre of the inner circle which is tangent to the minimum of the concave depression is set by a minimum amount below the sphere centre.

The semi-circle or hemisphere in the north pole, with the same radius of the inner circle, thus has a larger difference between the perimeter or sphere external diameter in the north pole and the smaller sphere in the north pole resulting from the new inner circle in the minimum of the concave depression with the displaced centre. Thus, the reversal points of the convex and concave radii change their position in the interior of the sphere. Thus, the angles of the maximum of the convex elevation or the minimum of the concave depression becomes smaller towards the reversal points.

The centre of the inner circle for the south pole is set above the sphere centre by the same given amount. The semicircle or hemisphere in the south pole, with the same radius of the inner circle, acquires the same large difference between the perimeter or sphere external diameter in the south pole and the smaller sphere in the south pole, as shown by the sphere geometry on the northern hemisphere. The clearance between this created drive sphere and the hollow cylinder with the complimentary geometry in the equatorial plane of the spherical drive element or frame, which largely surrounds the sphere and has an inner circle in the minimum of the concave depression with the same centre, gives the three-dimensional angle of the drive element obtained during pivoting.

The functions are calculated from the mechanical relationships of the spherical triangle and the oblique-angled triangle.

According to a special embodiment on the spherical drive element the depressions and elevations in the equatorial zone correspond as regards width to the associated elevations and depressions of the first drive element and with increasing distance from the equatorial zone the depressions become wider and the elevations narrower. If the inside of the first drive element contacts the sphere surface in the vicinity of the equatorial zone, the pitch of the depressions and elevations on the sphere precisely correspond to those on the inner wall of the cylindrical first drive element, so that there is no risk of jamming. With increasing pivoting the cylindrical inner phase, at least partly engages with part of the sphere, where the grooves or webs are closer together in accordance with the degrees of longitude on the globe, so that it can be appropriate in these areas to allow a certain clearance, which leads to a reduction in the convex and concave flank angles.

These and other features of the invention are pointed out in the claims. Other objects and advantages of the invention will become evident from the following detailed description when read in light of the accompanying drawings.

BRIEF DESCRIPTION OF THE DRAWINGS

FIG. 1 an open or detachable articulated joint.

FIGS. 2 and 3 parts of the articulated joint, which can be fixed to one another.

FIG. 4 a plan view of the parts in FIG. 3.

DETAILED DESCRIPTION OF PREFERRED EMBODIMENTS

In FIG. 1 a head piece is fitted to a first shaft and is formed by a roughly hollow cylindrical part 2, which is shown in sectional form in FIG. 1. Hollow cylinder 2 forms the first drive element or the cylindrical hollow drive element.

Figure 6:
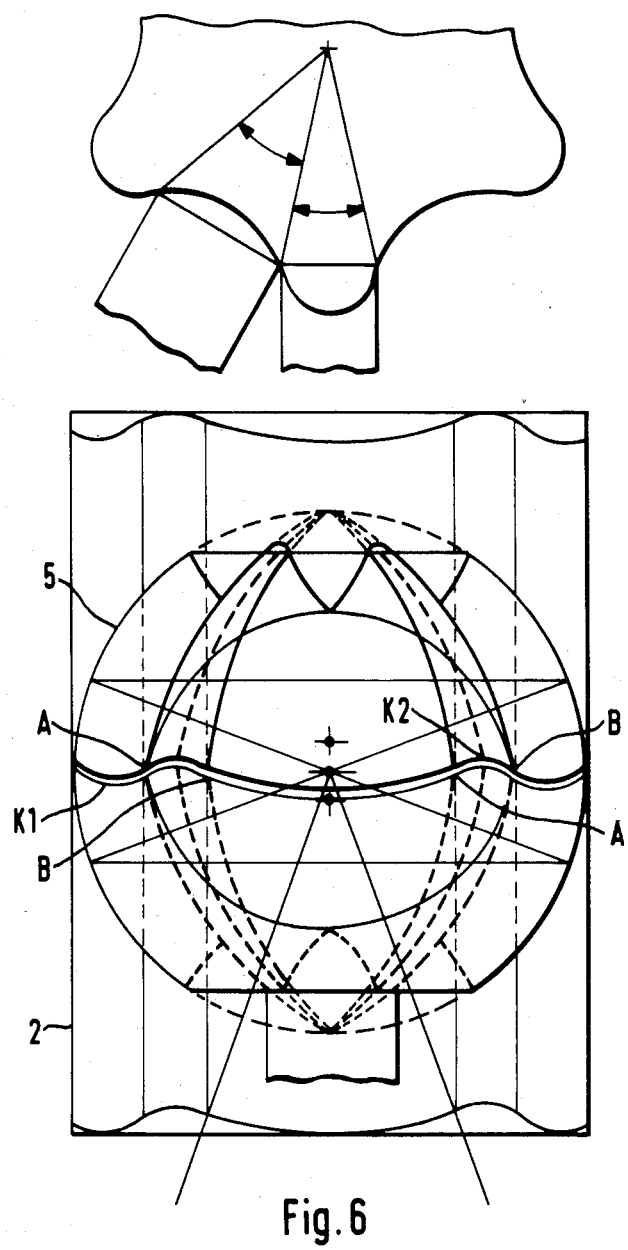
FIG. 6 an illustration of the invention on a sphere geometry.

A view of a shaft 3 is provided in the lower part of FIG. 1 and its upper end is connected via a neck 4 to a spherical second drive element 5, i.e. the spherical drive element. Both drive elements 2 and 5 correspond in the equatorial plane to TORX geometry (FIG. 6).

FIG. 4 shows the cylindrical hollow drive element 2 in plan view along line A—A. On its inside, it has six somewhat widened elevations 6 uniformly distributed about its longitudinal axis and between them are arranged in regularly distributed manner six narrower depressions 7. Compared with a circular circumferential line, a wavy profile is formed, which extends in axially parallel manner from the outer edge 2a of hollow drive element 2 towards the inside. Facing parts of depressions 7 have a spacing a and facing points of the elevations 6 a correspondingly smaller spacing b.

The spherical drive element 5 on the second shaft 3 carries wider depressions 8, between which there are narrower elevations 9.

In the section A—A according to FIG. 4, it can be seen that the equator of the spherical drive element 5 and the hollow drive element 2 are in contact in the plane indicated B—B in FIG. 1, because in the equatorial region of spherical drive element 5, its depressions 8 and elevations 9 have a roughly complimentary configuration to the elevations 6 and depressions 7 on the inner face of the hollow drive element 2. As shown by FIG. 1, the upper polar cap of the spherical drive element 5 is cut off at right angles to the axis of shaft 3, so that FIG. 4 shows a circular line 10 towards which run the depressions and elevations of the spherical surface.

In the embodiment according to FIG. 1, shaft 1 with the hollow drive element 2 can be freely mounted on the spherical drive element 5 of the shaft. Thus, if in the represented position the two shafts are secured against axial displacement, the represented articulated joint can be used without further parts.

Thus, an articulated joint according to FIG. 1 can be used as a screw and wrench. Thus, in accordance with the dotted line 11, on hollow drive element 2 a screw head 11a can be connected to a screw shank 11b. To a certain extent shaft 3 then belongs to a wrench, which can turn screw 11a, 11b with the spherically constructed drive element 5. As a result of the spherical construction, it is easy to insert such a wrench into the cylindrical part of the hollow drive element 2 and during screwing there is no need for the wrench axis to be aligned with the screw axis. It is therefore easier to actuate more difficultly accessible screw heads, even if the field of vision is restricted during actuation.

On spherical drive element 5, the depressions 8 compared with the elevations 6 of the hollow drive element 2 are appropriately narrower with increasing distance from the equatorial zone of the spherical part, i.e. towards the poles or the roughly web-shaped elevations 9 become narrower compared with the roughly groove-shaped depression 7 on the inner face of the first drive element 2. Thus, even in the case of somewhat greater pivoting of shafts 1 and 3 with respect to one another, there is no jamming between the two drive elements.

The three-dimensional swivel angle of the spherical articulated joint in the case of the spherical drive element is obtained on the one hand from the narrowing flank angles of the maxima of the convex elevation or the minima of the concave depression and their turning points from the equatorial plane to the polar caps and on the other hand in the case of the hollow drive element through the constant flank angles resulting from the maxima of the convex elevation and the minima of the concave depression and their turning points. The geometry of the hollow drive element is congruent with the sphere geometry in its equatorial plane.

FIG. 3 shows an embodiment, in which the spherical drive element 5 is constructed in the same way as in FIG. 1. However, instead of being provided with a round shaft, it is connected to a shaft or shank portion 12, which e.g. has a square or hexagonal surface and can be connected to a drive in some way, e.g. by clamping.

The hollow drive element is constructed as an upwardly open hollow cylinder 13, which has the same wavy profiling on its inside as described relative to FIGS. 1 and 4.

Section A—A of FIG. 1 shown in FIG. 4 corresponds in view and outlines with the plan view of FIG. 3, the plan view on drive element 13 taking the place of the section through hollow drive element 2.

According to FIG. 3, the cylindrical hollow drive element 13 is internally beaded on its lower end and consequently engages behind the spherical drive element 5 in such a way that the latter cannot be drawn out of drive element 13.

FIG. 2 illustrates a device for driving the element 13. The top of element 13 can receive, and have fixed therein, a coupling 14 having an approximately cylindrical surface complimentary to the surface of the inner face of the drive element 13. The coupling 14 axially extends from a shaft 15.

In front of the lower face 16 of part 14 and surface 17 of spherical drive element 5 adequate space must be provided to allow a pivoting of the sphere. Parts 13 and 14 co-operate in the same way as the known head and wrench construction according to German Pat. No. 17 28 574.

In an articulated joint according to FIGS. 2 and 3 the driving shaft 12 or 15 and the driven shaft 15 or 12 cannot move away from one another and the first drive element 13 acts as a frame or casing substantially surrounding sphere 5, which prevents the penetration of dirt.

Figure 5:
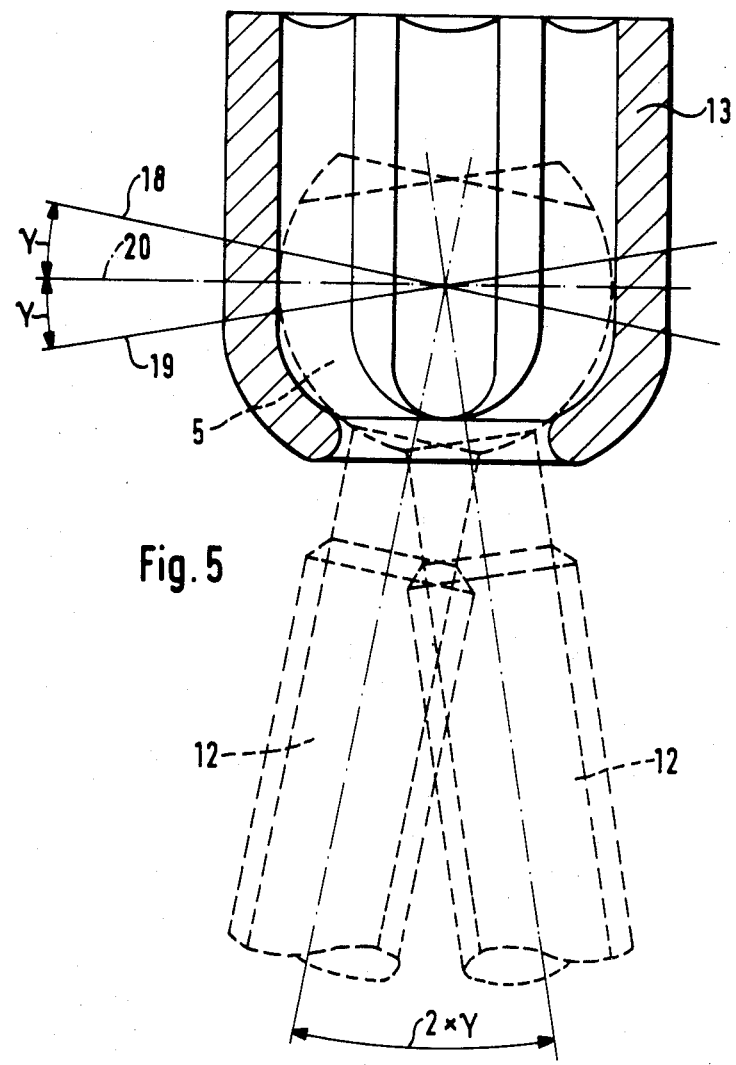
FIG. 5 an articulated joint according to FIG. 3 in which two positions of the second shaft with the second drive element fitted thereto are shown.

FIG. 5 shows on a larger scale drive element 13 according to FIG. 3, which embraces the spherical drive element 5, which can be pivoted in dotted line manner in two directions out of the aligned position and in opposite directions by an angle γ. This pivoting shown in the drawing plane of FIG. 5 can naturally take place in all directions, i.e. also upwards and downwards.

Lines 18 and 19 illustrate the central planes of sphere 5, which can be pivoted upwards or downwards by angle γ with respect to the position of line 20, which corresponds to the position with axes aligned.

Thus, the articulated joint according to the invention has five degrees of freedom, namely two for the rotation directions and three for the three-dimensional angle γ.

Thus, a reliable coupling is obtained between the two shafts, independently of which shaft serves as the drive and which shaft is driven. As a result of the positive connection between the profiled surfaces the specific loading of the materials is reduced, so that it is possible to prevent deformation, particularly due to shear forces, such as can occur with normal hexagon spanner arrangements.

As a result of the inventive construction three-dimensional pivotability exists between the hollow drive element 2 and the spherical drive element 5, the latter comprising sphere circles corresponding to the A and B points of a TORX, A and B being located in the same centre plane (FIG. 6). The three-dimensional pivot angle is obtained from the decreasing convex (K1) and concave (K2) angles on the spherical drive element 5 compared with the constant convex and concave angles on the hollow drive element 2.

I claim:

1. An articulated joint comprising a first drive element at the end of a first rotary shaft and a second drive element at the end of a second rotary shaft, said drive elements being pivotably engageable in such a way that the axes of the shafts can be pivoted with respect to one another up to a given angle, characterized in that the first drive element is shaped substantially like a hollow cylinder and is provided on its inner face with axis-parallel, uniformly circumferentially distributed, alternately convex and concave depressions and elevations which pass into one another and that the second drive element is substantially spherical and has on its surface alternating depressions and elevations which run in the longitudinal direction in planes containing the axis of the second shaft and having in the circumferential direction, along the equatorial plane of the spherical second drive element, a configuration complimentary to the inner face of the first drive element, said spherical second element forming a spherical body greater than half a sphere, the concave and convex depressions and elevations on said cylindrical first drive element being straight along the axis of the first element and extending a distance along the axis of the first element longer than the spherical second element; said spherical second element having a spherical center and first and second hemispheres on each side of the center along the axis of the second element, the depressions in said second element having minima extending along respective circular arcs each in a plane of the axis of the shaft of said second element, the circular arcs in each hemisphere having a center axially offset from the spherical center in the direction of the other hemisphere.

2. An articulated joint according to claim 1, characterized in that on the spherical second drive element the depressions are at least partly narrower than the elevations of the first drive element.

3. An articulated joint according to claim 2, characterized in that on the spherical drive element, the depressions and elevations in an equatorial plane have a width corresponding to the associated elevations or depressions of the first drive element and the depressions and elevations become narrower as the distance from the equatorial zone increases.

4. An articulated joint according to claim 1, characterized in that on the spherical second drive element the elevations are at least partly narrower than the depressions on the first drive element.

5. An articulated joint comprising a first drive element at the end of a first rotary shaft and a second drive element at the end of a second rotary shaft, said drive elements being pivotably engageable in such a way that the axes of the shafts can be pivoted with respect to one another up to a given angle, characterized in that the first drive element is shaped substantially like a hollow cylinder and is provided on its inner face with axis-parallel, uniformly circumferentially distributed, alternately convex and concave depressions and elevations which pass into one another and that the second drive element is substantially spherical and has on its surface alternating depressions and elevations, which run in the longitudinal direction in accordance with a plane containing the axis of the second shaft and having in the circumferential direction, particularly in the equatorial plane of the spherial second drive element a configuration roughly complimentary to the inner face of the first drive element, said elevations on said spherical second element being circumferentially convex and the depressions on said second element being circumferentially concave and merging circumferentially into said elevations on said spherical second element, said depressions on the spherical second element being circumferentially larger than said elevations, on said first element said elevations being circumferentially convex and said depressions being circumferentially concave and circumferentially merging into each other smoothly, with said elevations being circumferentially larger than said depressions;

said spherical second element having a spherical center and first and second hemispheres on each side of the center along the axis of the second element, the depressions in said second element having minima extending along respective circular arcs each in a plane of the axis of the shaft of said second element, the circular arcs in each hemisphere having a center axially offset from the spherical center in the direction of the other hemisphere.

6. An articulated joint according to claim 5, characterized in that each of the drive elements has six depressions between six elevations.

7. An articulated joint according to claim 6, characterized in that the circumferential transitions between depressions and elevations in the first drive element are continuous.

8. An articulated joint according to claim 6, characterized in that on the spherical drive element the depressions and elevations in equatorial plane have a width corresponding to the associated elevations or depressions of the first drive element and the depressions become narrower as the distance from the equatorial zone increases.

9. An articulated joint according to claim 5, characterized in that the transitions between depressions and elevations on said first element are continuous.

10. An articulated joint according to claim 9, characterized in that the median plane of each depression or elevations contains the rotation axis of the particular drive element.

11. An articulated joint according to claim 9, characterized in that on the spherical drive element the depressions and elevations in equatorial plane have a width corresponding to the associated elevations or depressions of the first drive element and the depressions become narrower as the distance from the equatorial zone increases.

12. An articulated joint according to claim 5, characterized in that the median plane of each depression or elevation contains the rotation axis of the particular drive element.

13. An articulated joint according to claim 12, characterized in that on the spherical drive element the depressions and elevations in equatorial plane have a width corresponding to the associated elevations or depressions of the first drive element and the depressions become narrower as the distance from the equatorial zone increases.

14. An articulated joint according to claim 5, characterized in that on the spherical drive element the depressions and elevations in equatorial plane have a width corresponding to the associated elevations or depressions of the first drive element and the depressions become narrower as the distance from the equatorial zone increases.

15. An articulated joint comprising a first drive element at the end of a first rotary shaft and a second drive element at the end of a second rotary shaft, said drive elements being pivotably engageable in such a way that the axes of the shafts can be pivoted with respect to one another up to a given angle, characterized in that the first drive element is shaped substantially like a hollow cylinder and is provided on its inner face with axis-parallel, uniformly circumferentially distributed, alternately convex and concave depressions and elevations which pass into one another and that the second drive element is substantially spherical and has on its surface alternating depressions and elevations, which run in the longitudinal direction in accordance with a plane containing the axis of the second shaft and having in the circumferential direction, particularly in the equatorial plane of the spherical second drive element a configuration roughly complimentary to the inner face of the first drive element, said spherical second element having a spherical center and first and second hemispheres on each side of the center along the axis of the second element, the depressions in said second element having minima extending along respective circular arcs each in a plane of the axis of the shaft of said second element, the circular arcs in each hemisphere having a center axially offset from the spherical center in the direction of the other hemisphere.

16. An articulated joint as in claim 15, characterized in that each of the drive elements has six depressions between six elevations.

17. An articulated joint according to claim 16, characterized in that the median plane of each depression or elevation contains the rotation axis of the particular drive element.

18. An articulated joint according to claim 16, characterized in that on the spherical second drive element the depressions are at least partly narrower than the elevations of the first drive element.

19. An articulated joint according to claim 16, characterized in that the transitions between depressions and elevations on said first element are continuous.

20. An articulated joint according to claim 19, characterized in that the median plane of each depression or elevation contains the rotation axis of the particular drive element.

21. An articulated joint according to claim 19, characterized in that on the spherical second drive element the depressions are at least partly narrower than the elevations of the first drive element.

22. An articulated joint according to claim 19, characterized in that on the spherical second drive element the elevations are at least partly narrower than the depressions on the first drive element.

23. An articulated joint according to claim 16, characterized in that on the spherical second drive element the elevations are at least partly narrower than the depressions on the first drive element.

24. An articulated joint according to claim 15, characterized in that the median plane of each depression or elevation contains the rotation axis of the particular drive element.

25. An articulated joint according to claim 15, characterized in that on the spherical second drive element the depressions are at least partly narrower than the elevations of the first drive element.

26. An articulated joint according to claim 15, characterized in that on the spherical second drive element the elevations are at least partly narrower than the depressions on the first drive element.

* * * * *